United States Patent [19]

Rovner

[11] Patent Number: 4,901,756
[45] Date of Patent: Feb. 20, 1990

[54] I/P CONVERTER WITH SIMULATED COMPENSATION

[75] Inventor: Bruce D. Rovner, Eden Prairie, Minn.

[73] Assignee: Rosemount Inc., Eden Prairie, Minn.

[21] Appl. No.: 350,246

[22] Filed: May 11, 1989

[51] Int. Cl.$^4$ ............................................. G05D 16/00
[52] U.S. Cl. .................................................. 137/487.5
[58] Field of Search ....................... 137/487.5, 486, 85

[56] References Cited

U.S. PATENT DOCUMENTS

| | | | |
|---|---|---|---|
| 4,086,804 | 5/1978 | Ruby | 137/487.5 X |
| 4,481,967 | 11/1984 | Frick | 137/487.5 X |
| 4,492,246 | 1/1985 | Prescott | 137/85 |
| 4,630,631 | 12/1986 | Barnes | 137/487.5 X |
| 4,665,938 | 5/1987 | Brown | 137/487.5 X |

Primary Examiner—Alan Cohan
Attorney, Agent, or Firm—Kinney & Lange

[57] ABSTRACT

A current-to-pressure converter sets line pressure to a desired pressure indicated by the current. A circuit senses the line pressure and the current, receives compensation, and outputs a compensated difference between line and desired pressures. A first driver circuit provides actuator drive based on the compensated output. The actuator controls the line pressure, but presents a temperature sensitive, reactive load to the actuator drive. A simulated load simulates a resistive part of the actuator load. A second driver provides simulated drive to the simulated load. The second driver generates the compensation which simulates actuator drive parameters, but is isolated from reactive effects and temperature sensitivity of the actuator.

15 Claims, 2 Drawing Sheets

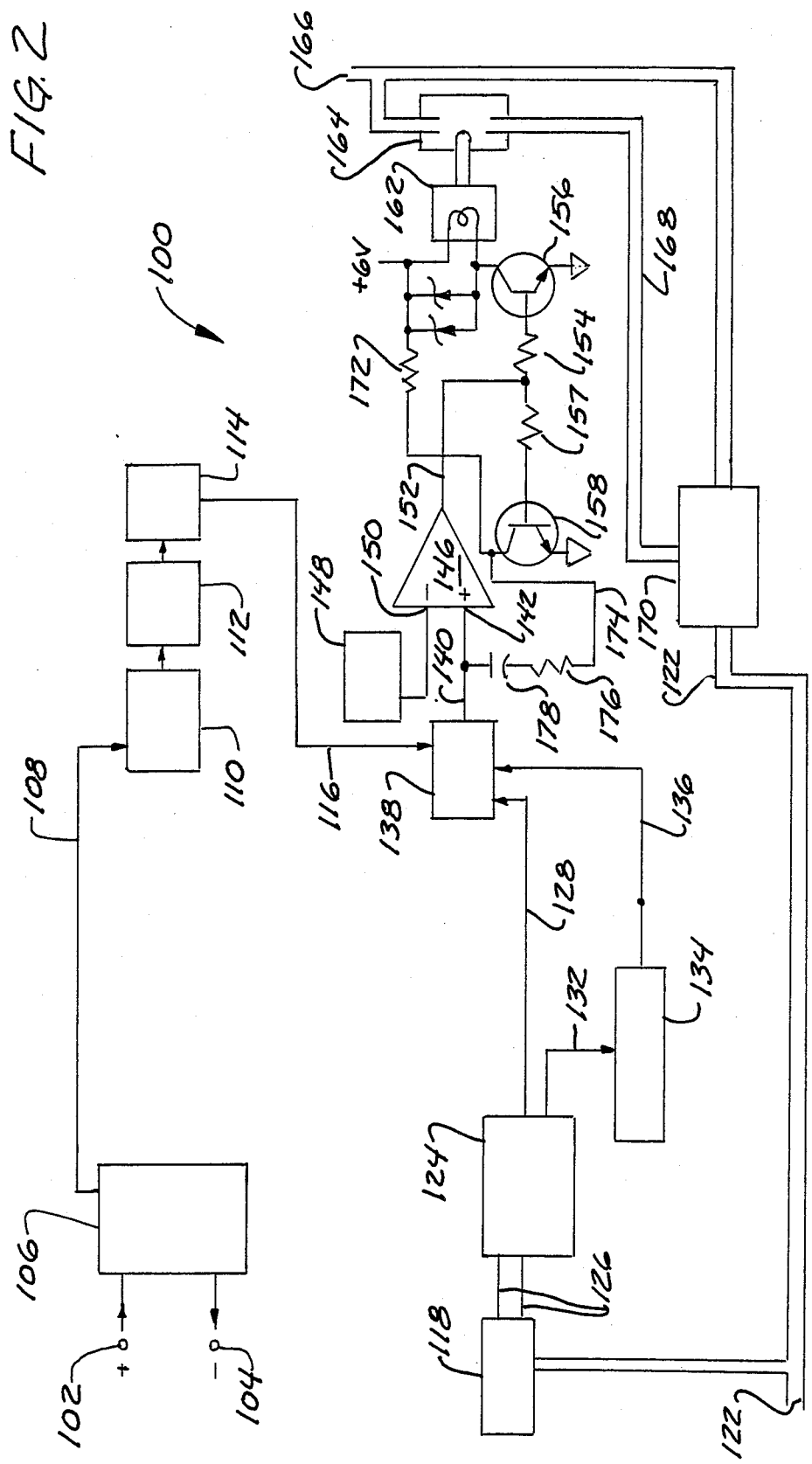

I/P CONVERTER WITH SIMULATED COMPENSATION

BACKGROUND OF THE INVENTION

1. Field of the Invention

This invention relates to current-to-pressure (I/P) converters.

2. Description of the Prior Art

In current-to-pressure converters, there are delays introduced by magnetic actuators or mechanical pressure boosters which control line pressure. When the line pressure is sensed and fed back to provide closed loop control of an actuator driver, the feedback is frequency compensated to account for the delays. The frequency compensation has been taken from the actuator drive which is subject to undesired inductive and temperature effects from the load which the actuator presents to the actuator drive. The undesired inductive and temperature affects limit the operating range of the current to pressure converter. There is thus a need to extend the temperature range of current to pressure converters and to provide improved compensation which is free of undesired reactive components of the actuator.

SUMMARY OF THE INVENTION

In the present invention, a current-to-pressure converter provides simulated compensation to avoid undesired reactive components or temperature effects found in an actuator load in the converter. The converter controls a line pressure according to a signal received by the converter indicating a desired pressure. The converter comprises sensing means for sensing the line pressure and the signal. The sensing means receive compensation and provide a compensated output representative of the line and desired pressures. The converter also comprises first driver means for providing an actuator drive as a function of the compensated output and an actuator controlling the line pressure as a function of the actuator drive. The actuator presents an actuator load to the actuator drive which has undesired parameters such as reactance and temperature sensitivity. The converter further comprises a simulated load simulating a desired portion of the actuator load, avoiding undesired reactance and temperature parameters of the actuator. The converter comprises second driver means for providing a simulated drive to the simulated load as a function of the compensated output. The second driver means further generates the compensation as a function of the simulated drive such that the compensation is representative of the actuator drive but isolated from the actuator load.

BRIEF DESCRIPTION OF THE DRAWINGS

FIG. 2 is a partial schematic, partial block diagram of a circuit according to the invention.

DETAILED DESCRIPTION OF THE PREFERRED EMBODIMENTS

Figure 1:
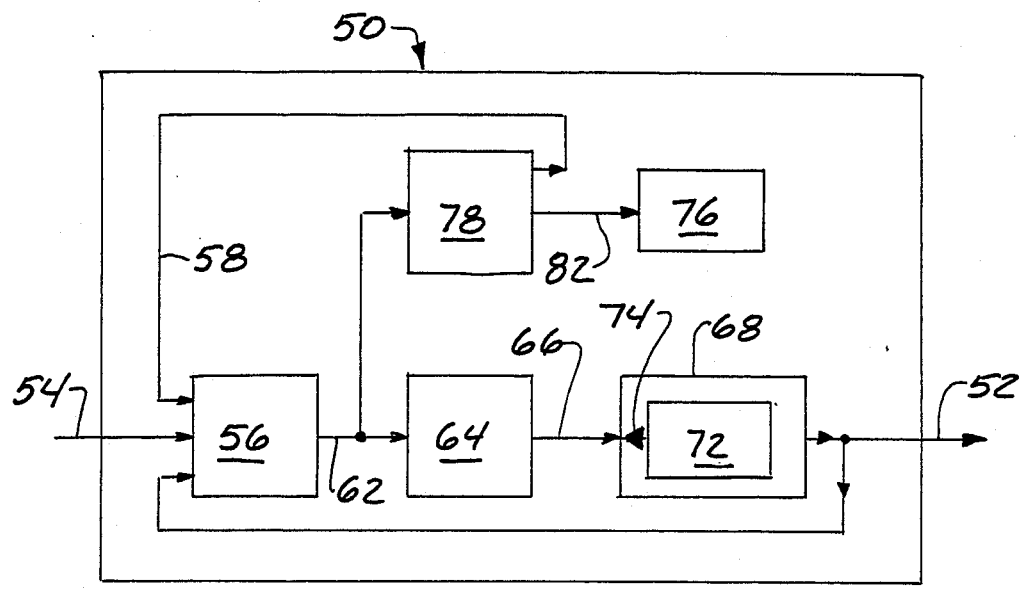
FIG. 1 is a block diagram of a current to pressure converter according to the invention.

In FIG. 1, a block diagram of a first preferred embodiment of a current-to-pressure converter 50 is shown. The converter 50 controls a line pressure 52 according to signal 54 received by converter 50 indicating a desired pressure. Sensing means 56 sense the line pressure 52 and the signal 54. Sensing means 56 also receive compensation from a line 58 and provide a compensated output 62 representative of the line pressure 52 and the desired pressure indicated by signal 54. First driver means 64 provide an actuator drive 66 as a function of the compensated output 62. Actuator 68 controls the line pressure 52 as a function of the actuator drive 66, however the actuator 68 presents an actuator load 72 to the actuator drive 66 as indicated by arrow 74.

Simulated load 76 simulates a desired portion of the actuator load 72. Second driver means 78 provide a simulated drive 82 to the simulated load 76 as a function of the compensated output 62. The second driver means 78 further generate the compensation 58 as a function of the simulated drive 82 such that the compensation 58 is representative of the actuator drive 66 but isolated from the actuator load 72.

The compensated output 62 represents a difference between the line pressure 52 and the desired pressure as indicated by the signal 54. The compensation 58 slows the response of the compensated output 62 to changes in the difference between line pressure 52 and desired pressure. The compensation adapts the drive to be compatible with the gain and delay parameters of the actuator 68 and the sensor means 56.

In FIG. 2, a second preferred embodiment of the invention is shown at 100, adapting the present invention to a current-to-pressure converter such as shown in U.S. Pat. No. 4,665,938 (PCT WO88/02509), incorporated herein by reference.

In FIG. 2., a 4–20 milliampere control signal is received at terminals 102, 104 and provides an indication of a desired pressure to the converter. A current sensor 106 senses the current and provides a SENSE output along line 108 to a circuit 110 which provides converter pressure limiting when the current is too high. The sense signal is further conditioned by an operator adjusted normal/reverse selection switch 112 and an operator adjusted span adjustment 114 to provide a conditioned output on line 116 representative of the desired pressure. A pressure sensor 118 senses the pressure 122 at the output of the converter and generates a pressures sensor output coupled to amplifier 124 along lines 126. The amplifier 124 provides an output representative of actual pressure on line 128 and an output representative of temperature on line 132. A temperature compensation circuit 134 generates a temperature compensation output on line 136. The output representative of desired pressure on line 116, the output representative of pressure on line 128 and the temperature compensation output on line 136 are all fed into a summing node 138. The summing node 138 provides an output on line 140 which is a temperature compensated representation of the difference between the actual pressure at 122 and the desired pressure as indicated by the received 4–20 mA current passing through terminals 102, 104. The output on line 140 is coupled to a first input 142 of an amplifier 146. A zero adjustment 148 is coupled to a second amplifier input 150. The amplifier 146 provides a compensated output on line 152. The compensated output on line 152 drives a base of a transistor 156 via a resistor 154 and also drives a base of a transistor 158 via a resistor 157. The transistor 156 drives the magnetic actuator 162 which actuates pilot valve 164. Pilot valve 164 receives a supply of pressurized gas from line 166 and provides a pilot pressure on line 168 as a function of the actuator drive. The pilot pressure in line 168 in turn controls a pneumatic booster valve 170 which supplies the output pressure to the line 122. There is delay between a change in the drive to the actuator and a change in output pressure on line 122, and hence frequency compensation is needed. The actuator 162 is a magnetic actuator formed as an electromagnet coil of copper wire. The load thus presents undesired reactive components and variations with temperature to the drive from transistor 156. These undesired load parameters interfere with compensation. Another source of compensation is thus needed which is relatively insensitive to load temperature and free of inductive components, but responsive to changes in the driver parameters. Transistors 156 and 158 are matched so that transistor 158 can provide a drive which simulates the drive provided by transistor 156 so far as temperature parameters are concerned, however, different resistances can be used for resistors 154, 157 so that the simulated drive takes less power than the actuator drive. A non-inductive, temperature stable resistor 172 is provided as a load to the simulated drive. The simulated drive is thus free of inductive or temperature effects from the simulated load of resistor 172. Compensation is coupled from the simulated drive along line 174 through resistor 176 and capacitor 178 to the input 142 of amplifier 146.

In FIG. 2, transistors 156, 158 provide actuator drive and simulated drive, however, other amplifiers such as field effect transistors, push-pull stages, or operational amplifiers can be used in place of transistor 156, 158 to provide simulated drive and actuator drive. The use of a simulated load to provide compensation can also be applied to a current-to-pressure converter using a piezoelectric actuator such as shown in U.S. Pat. No. 4,492,246 to Prescott et al., incorporated herein by reference. The current-to-pressure converter of the present invention can be used as a part of a valve positioner in which the position of the valve is sensed and fed back to the converter as the representation of the desired line pressure.

While the present invention has been described with reference to preferred embodiments, workers skilled in the art will recognize that changes may be made in form and detail without departing from the spirit and scope of the invention.

What is claimed is:

1. A converter controlling a line pressure according to a signal received by the converter indicating a desired pressure, comprising:
    sensing means for sensing the line pressure and the signal, the sensing means receiving compensation and providing a compensated output representative of the line and desired pressures;
    first driver means for providing an actuator drive as a function of the compensated output;
    actuator means for controlling the line pressure as a function of the actuator drive, the actuator means presenting an actuator load to the actuator drive;
    a simulation circuit including a simulated load simulating a desired portion of the actuator load and a second driver providing drive thereto as a function of the compensated output and generating the compensation representative of the actuator drive but isolated from the actuator load.

2. The converter of claim 1 wherein the the actuator means delays a change in line pressure after a change in actuator drive, and the compensation compensates for the delay.

3. The converter of claim 2 wherein the simulated load comprises a resistor.

4. The converter of claim 3 wherein the simulated load is substantially non-reactive.

5. The converter of claim 4 wherein the resistor has a resistance which is substantially independent of temperature.

6. The converter of claim 5 wherein the compensation is coupled from the simulated load to the sensing means.

7. A converter controlling a line pressure according to a signal received by the converter indicating a desired pressure, comprising:
    sensing means for sensing the line pressure and the signal, the sensing means receiving compensation and providing a compensated output representative of the line and desired pressures;
    first driver means for providing an actuator drive as a function of the compensated output;
    an actuator controlling the line pressure as a function of the actuator drive, the actuator presenting an actuator load to the actuator drive;
    a simulated load simulating a desired portion of the actuator load; and
    second driver means for providing a simulated drive to the simulated load as a function of the compensated output, the second driver means further generating the compensation as a function of the simulated drive such that the compensation is representative of the actuator drive but isolated from the actuator load.

8. The converter of claim 7 wherein the compensated output is representative of a difference between the line pressure and the desired pressure.

9. The converter of claim 8 wherein the compensation slows the response of the compensated output to changes in the difference between line pressure and desired pressure.

10. The converter of claim 9 wherein the simulated load comprises a resistor.

11. The converter of claim 10 wherein the simulated load is substantially non-reactive.

12. The converter of claim 11 wherein the resistor has a resistance which is substantially independent of temperature.

13. The converter of claim 12 wherein the simulated drive and actuator drive comprise currents, and wherein the simulated drive current is less than the actuator drive current such that power used for simulation is reduced.

14. The converter of claim 13 wherein the first driver means further comprise a first drive transistor and the second driver means further comprise a second drive transistor, the first and second drive transistors having a substantially similar sensitivity to temperature.

15. The converter of claim 14 wherein the first and second driver means further comprise first and second base resistances respectively which couple the compensated output to the first and second drive transistors respectively, where the first base resistance is substantially less than the second base resistance such that the simulated load operates at a lower power level than the actuator.

* * * * *